Oct. 30, 1951     J. F. STOKES     2,573,506

CAM SYSTEM

Filed April 4, 1946

*INVENTOR.*
JOHN F. STOKES

BY

*M. O. Hayes*

ATTORNEY

Patented Oct. 30, 1951

2,573,506

UNITED STATES PATENT OFFICE 2,573,506

CAM SYSTEM

John F. Stokes, Los Angeles, Calif., assignor to the United States of America as represented by the Secretary of the Navy Application April 4, 1946, Serial No. 659,640

6 Claims. (Cl. 74—569)

This invention relates to a cam system, and more particularly to a magnetic cam system in which the cam and cam follower are maintained in operable contact by means of magnetic flux.

Cam follower systems have heretofore been numerous and are well known in the art. In all such ordinary cam follower systems, however, it has been necessary that the follower be pressed against the cam by means of a spring or other suitable arrangement. Similarly, it has been necessary that the pressure be transmitted to the cam follower by means of bearings or specialized mountings in cases where the cam follower consists of a roller and in all cases the reaction pressure necessarily is transferred to the bearings of the camshaft.

An object of this invention is to provide a cam system which minimizes the reaction pressure transferred to the bearings of the camshaft.

Another object of this invention is to provide a cam system utilizing magnetic attraction for effecting continuous physical contact between the cam and the cam follower.

A further object of this invention is to provide a magnetic cam system in which magnetic attraction exerted directly between the cam and the cam follower acts to maintain them in operational contact.

A still further object of this invention is to provide a magnetic cam system having a universal mounting for one of the elements of the system to insure an improved operational contact between the cam and cam follower.

Figure 1:
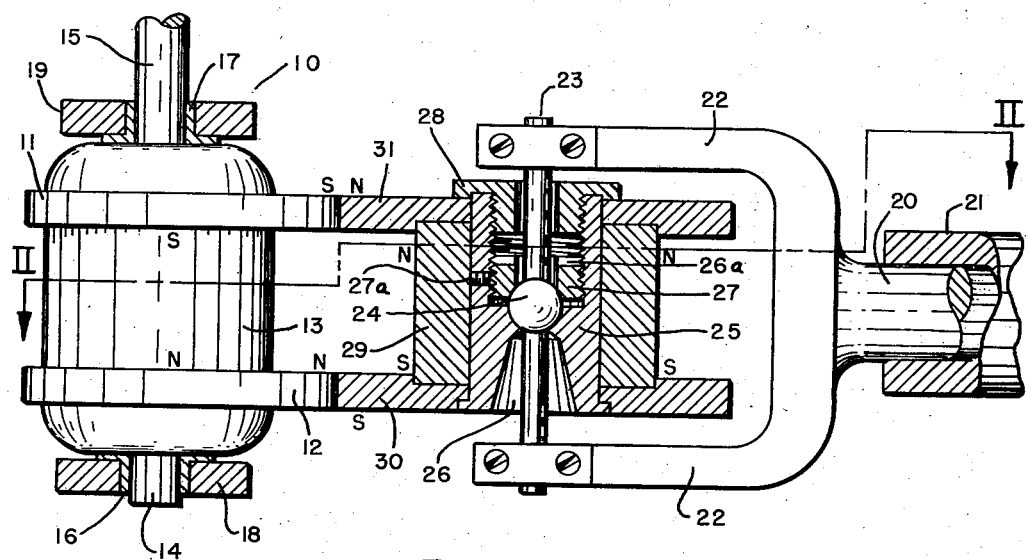
Figure 2:
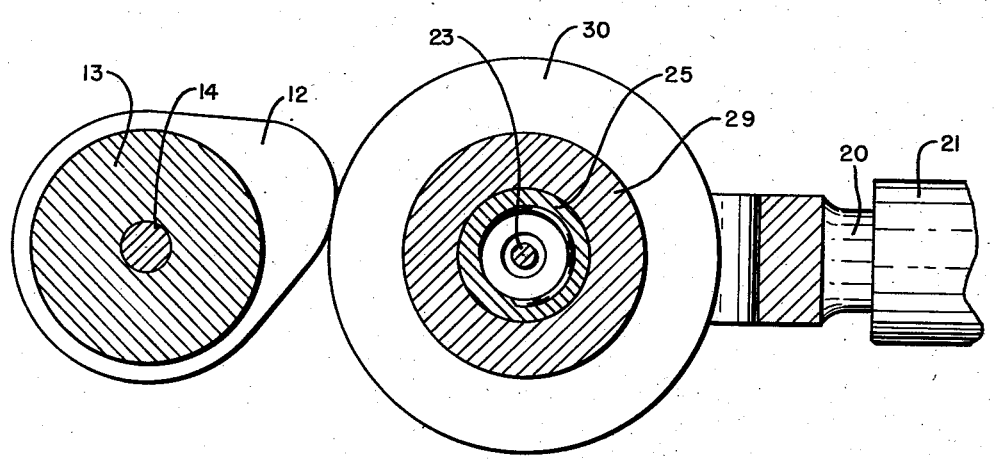

These and other objects of the present invention will be apparent when taken in connection with the following specification and accompanying drawings, in which:

Fig. 1 is a vertical partially sectional view of one embodiment of this invention; and Fig. 2 is a sectional view taken along the lines II—II of Fig. 1.

Referring to the drawings, there is shown a cam assembly 10 consisting of a pair of laterally spaced cam tracks 11 and 12, mounted upon a cam spacer 13 having a shaft 14 extending through the center thereof and projecting outwardly from the opposite ends thereof at 14 and 15. Shaft sections 14 and 15 are disposed within bearings 16 and 17 which are fixedly secured to a pair of brackets 18 and 19, respectively, in order to provide a rotatable mount for the entire cam assembly. Shaft section 15 may be caused to rotate in bearing 17 in any suitable manner as by means of a motor (not shown) to cause rotation of cam spacer 13 together with cam tracks 11 and 12. A cam follower support 20 is slidably mounted in a suitable guide 21 to allow longitudinal reciprocatory motion of the cam follower in response to displacement thereof as determined by the contour of the cam tracks. A yoke 22 formed on one end of follower support 20 serves to mount a shaft 23 in a direction transverse to the direction of the reciprocatory motion of the follower support. A spherical bearing, which may be, for instance, a ball 24, is provided at the center of shaft 23 to provide a flexible mounting for the cam follower, as hereafter explained. The cam follower itself is composed of a universal mounting hub 25 having a conical opening 26 therein at one end thereof and a threaded cylindrical opening 26a therein at the opposite end thereof. Joining these two openings is a hemispherical-shaped opening which acts as a socket for spherical bearing 24. A threaded socket 27 is threadably mounted in cylindrical opening 26a and maintained in contact with bearing 24 by means of a lock screw 27a. Hub 25 is provided with a flange at the lower end thereof, and with a threadably mounted flanged plug 28 at the opposite end thereof to maintain the entire cam follower in an assembled relationship. An annular cylindrical magnet 29 together with a pair of cam follower tracks 30 and 31 are concentrically and annularly disposed about mounting hub 25 to complete the cam follower mechanism. As shown, the cam follower tracks are maintained in a spaced relationship by means of annular magnet 29 the entire assembly being held in an assembled relationship by means of the flanges heretofore recited. By thus mounting the double cam follower universally, it may adjust itself to any inequalities and keep the follower disks in constant metallic contact with the two spaced cam tracks.

In operation, assuming that magnet 29 is oriented as shown in Fig. 1, resultant north and south poles will be set up in cam tracks 30 and 31 as indicated in the figure. The magnetic circuit is completed through the magnetic permeable cam follower tracks 30 and 31 through cam tracks 11 and 12 and through the cam spacer 13. This magnetic action maintains the cam follower tracks and the cams in physical contact thereby eliminating and minimizing primary and reactive forces which are normally transmitted to the cam assembly and to the cam follower assembly through the bearings and mountings thereof in cam systems heretofore designed. Thus, upon rotation of the cam assembly, the cam follower assembly will be rotated and maintained in physical contact with the cam surfaces due solely to the magnetic attraction between the cams and cam follower tracks. While a permanent magnet has been disclosed as being mounted upon the cam follower assembly, this magnet may be either of permanent nature or an electromagnetic magnet and may be mounted either upon the cam follower or upon the cam spacer as may be found to be desirable. Likewise, it is to be understood that while a pair of cam tracks have been disclosed which provide a magnetic circuit, a single cam track and cam follower track may be employed if this be desired. Due to the fact that the magnetic circuit is not changed in any substantial degree by relative motion of the cam and cam follower, the force which maintains physical contact between the cam track and cam follower tracks has no substantial tendency to rotate the cam. The majority of the magnetic flux passes through the cam and cam follower contact and the gaps at these points do not change materially by rotation. Although the total length of the magnetic circuit to the system may vary due to the variation of the projection of the cam from the cam spacer, the circuit permeability is maintained essentially constant as the circuit is composed entirely of magnetic permeable material.

While a particular embodiment of this invention has been disclosed and described, it is to be understood that various changes and modifications may be made herein without departing from the spirit and scope of the appended claims.

What is claimed is:

1. A cam system comprising a rotatable cam assembly having a pair of spaced cam track members, a cam follower assembly movable toward and away from the axis of rotation of said cam assembly having a pair of correspondingly spaced cam follower track members, said members of each assembly being magnetically interconnected with each assembly forming a closed magnetic circuit through said assemblies, the magnetic interconnection of at least one of said assemblies being magnetized.

2. A cam system comprising a rotatable cam assembly having a pair of laterally spaced cam track members, a rotatable cam follower assembly movable toward and away from the axis of rotation of said cam assembly having a pair of correspondingly spaced cam follower members, said members of each assembly being magnetically interconnected with each assembly forming a closed magnetic circuit through said assemblies, and a permanently magnetized spacer between one pair of said members.

3. A cam system comprising a rotatable cam assembly having a pair of laterally spaced cam tracks which are interconnected by magnetic material and a rotatable cam follower assembly movable toward and away from the axis of rotation of said cam assembly, said cam follower assembly being composed of a pair of laterally spaced discs of magnetic material and a magnetizing member interconnecting said discs.

4. A cam system comprising a rotatable cam assembly having a pair of laterally spaced cam tracks interconnected by magnetic material and a rotatable cam follower assembly movable toward and away from the axis of rotation of said cam assembly, said cam follower assembly being composed of a pair of laterally spaced disks of magnetic material and an axially extending hollow cylindrical magnetized member having opposite poles at the ends thereof contacting said discs.

5. A cam system comprising a rotatable cam assembly having a pair of laterally spaced cam track members magnetically interconnected within said assembly, a cam follower assembly having a pair of correspondingly spaced cam follower members magnetically interconnected within said assembly for forming a closed magnetic circuit through said assemblies, means for magnetizing at least one of said magnetically interconnected assemblies, and a universal mounting for one of said assemblies for permitting said assembly to swing to permit said laterally spaced cam follower members to follow said cam track members in close contact.

6. A cam system comprising a rotatable cam assembly having a pair of laterally spaced cam tracks magnetically interconnected within said assembly, a cam follower assembly having a pair of correspondingly spaced cam follower members, a hollow cylindrical magnet member disposed between and in contact with said follower members, said magnet member having opposite poles at the ends thereof, and a universal mounting for said follower assembly for permitting movement of said assembly for maintaining said follower members in contact with said track members.

JOHN F. STOKES.

REFERENCES CITED

The following references are of record in the file of this patent:

UNITED STATES PATENTS

| Number | Name | Date |
| --- | --- | --- |
| 968,574 | Lecoche | Aug. 30, 1910 |
| 1,658,318 | Wineman | Feb. 7, 1928 |
| 2,167,641 | Dewan | Aug. 1, 1939 |